(12) United States Patent
Vaughn (10) Patent No.: US 9,684,797 B2
(45) Date of Patent: Jun. 20, 2017

(54) PROTECTING PRIVACY WITH SECURE DIGITAL SIGNAGE IN VEHICLE REGISTRATION PLATES

(71) Applicant: Intel Corporation, Santa Clara, CA (US)

(72) Inventor: Robert Lawson Vaughn, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 98 days.

(21) Appl. No.: 14/566,947

(22) Filed: Dec. 11, 2014

(65) Prior Publication Data

US 2016/0171219 A1  Jun. 16, 2016

(51) Int. Cl.

| G06F 7/04 | (2006.01) |
|---|---|
| G06F 21/62 | (2013.01) |
| G08G 1/00 | (2006.01) |
| G06Q 10/00 | (2012.01) |
| G06F 21/10 | (2013.01) |
| H04L 29/06 | (2006.01) |

(52) U.S. Cl.
CPC ......... *G06F 21/6245* (2013.01); *G06Q 10/00* (2013.01); *G08G 1/00* (2013.01); *G06F 21/10* (2013.01); *H04L 63/0428* (2013.01)

(58) Field of Classification Search
CPC .. G06F 21/10; H04L 63/0422; H04L 63/0428
USPC ................................. 726/26; 713/150, 189
See application file for complete search history.

(56) References Cited

U.S. PATENT DOCUMENTS

| 5,844,523 | A | * | 12/1998 | Brennan | ................... | H01Q 1/22 |
|---|---|---|---|---|---|---|
| | | | | | | 174/138 A |
| 9,129,118 | B1 | * | 9/2015 | Johansson | ............ | G06F 21/6227 |
| 2002/0021210 | A1 | * | 2/2002 | Naddeo | ..................... | B60Q 1/56 |
| | | | | | | 340/425.5 |
| 2003/0112242 | A1 | * | 6/2003 | Vitale | ....................... | B60Q 1/56 |
| | | | | | | 345/440 |
| 2004/0189493 | A1 | * | 9/2004 | Estus | ........................ | G08G 1/20 |
| | | | | | | 340/988 |
| 2005/0240410 | A1 | * | 10/2005 | Charles | ............... | H04M 3/4936 |
| | | | | | | 704/270 |
| 2006/0213100 | A1 | * | 9/2006 | McCann | ................. | B60R 13/00 |
| | | | | | | 40/591 |
| 2007/0008084 | A1 | * | 1/2007 | Wu | ........................ | G08G 1/017 |
| | | | | | | 340/425.5 |
| 2008/0048521 | A1 | * | 2/2008 | Mabuchi | ............... | B60C 23/041 |
| | | | | | | 310/309 |

(Continued)

*Primary Examiner* — Saleh Najjar
*Assistant Examiner* — Peiliang Pan
(74) *Attorney, Agent, or Firm* — Schwegman Lundberg & Woessner, P.A.

(57) ABSTRACT

Various systems and methods for protecting privacy with secure digital signage in vehicle registration plates are described herein. A system with an electronic registration plate for protecting privacy with secure digital signage, the electronic registration plate attached to a vehicle, the system may include a data access module to: access, a data store of registration numbers, the data store including a plurality of unique registration plate numbers and assigned to the vehicle; and retrieve a registration plate number from the data store; and a display module to present the registration plate number on the electronic registration plate.

25 Claims, 5 Drawing Sheets

(56) References Cited

U.S. PATENT DOCUMENTS

| | | | | |
|---|---|---|---|---|
| 2009/0119599 | A1* | 5/2009 | Hazen | G06Q 30/02 715/738 |
| 2009/0288320 | A1* | 11/2009 | El Emam | G08G 1/017 40/200 |
| 2011/0078933 | A1* | 4/2011 | Lukawitz | B60Q 1/503 40/204 |
| 2013/0204717 | A1* | 8/2013 | Bookstaff | G06Q 10/00 705/14.73 |
| 2013/0262275 | A1* | 10/2013 | Outwater | G06Q 10/02 705/27.1 |
| 2014/0090280 | A1* | 4/2014 | Cunningham | B60R 25/104 40/201 |
| 2014/0249713 | A1* | 9/2014 | Davis | B60R 25/00 701/36 |
| 2015/0353031 | A1* | 12/2015 | Cairo | B60R 25/33 340/425.5 |
| 2016/0039364 | A1* | 2/2016 | Findlay | B60R 13/105 340/468 |
| 2016/0082902 | A1* | 3/2016 | Belegu | B60R 13/10 340/468 |

* cited by examiner

PROTECTING PRIVACY WITH SECURE DIGITAL SIGNAGE IN VEHICLE REGISTRATION PLATES

TECHNICAL FIELD

Embodiments described herein generally relate to security and in particular, to protecting privacy with secure digital signage in vehicle registration plates.

BACKGROUND

A vehicle registration plate is a plate typically manufactured from plastic or metal, and used for official identification purposes. The vehicle registration plate includes a numeric or alphanumeric code that uniquely identifies the vehicle within the issuing authority's database. The vehicle registration plate may alternatively be referred to in countries as a license plate, tag, number plate, rego plate, or other name.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

A static registration plate may be used by nefarious people to track a vehicle's routes, locations, destinations, or other activity. With available software and an array of cameras, unauthorized people may record thousands or millions of vehicles, identify and catalog the registration numbers, and then correlate the vehicles' locations with previous scans to obtain route information.

For example, vehicle repossession companies have recently begun to outfit their tow trucks with cameras and software to capture traffic during their operation. Tow truck operators share their registration plate information with other outfits to aggregate rich data. As the quantity of scanned plates increases, a wealth of information about people becomes readily available, such as where they go, who they are with, and what they do. While there are some legitimate uses of such data, such as for law enforcement, privacy concerns are abundant.

Figure 1:
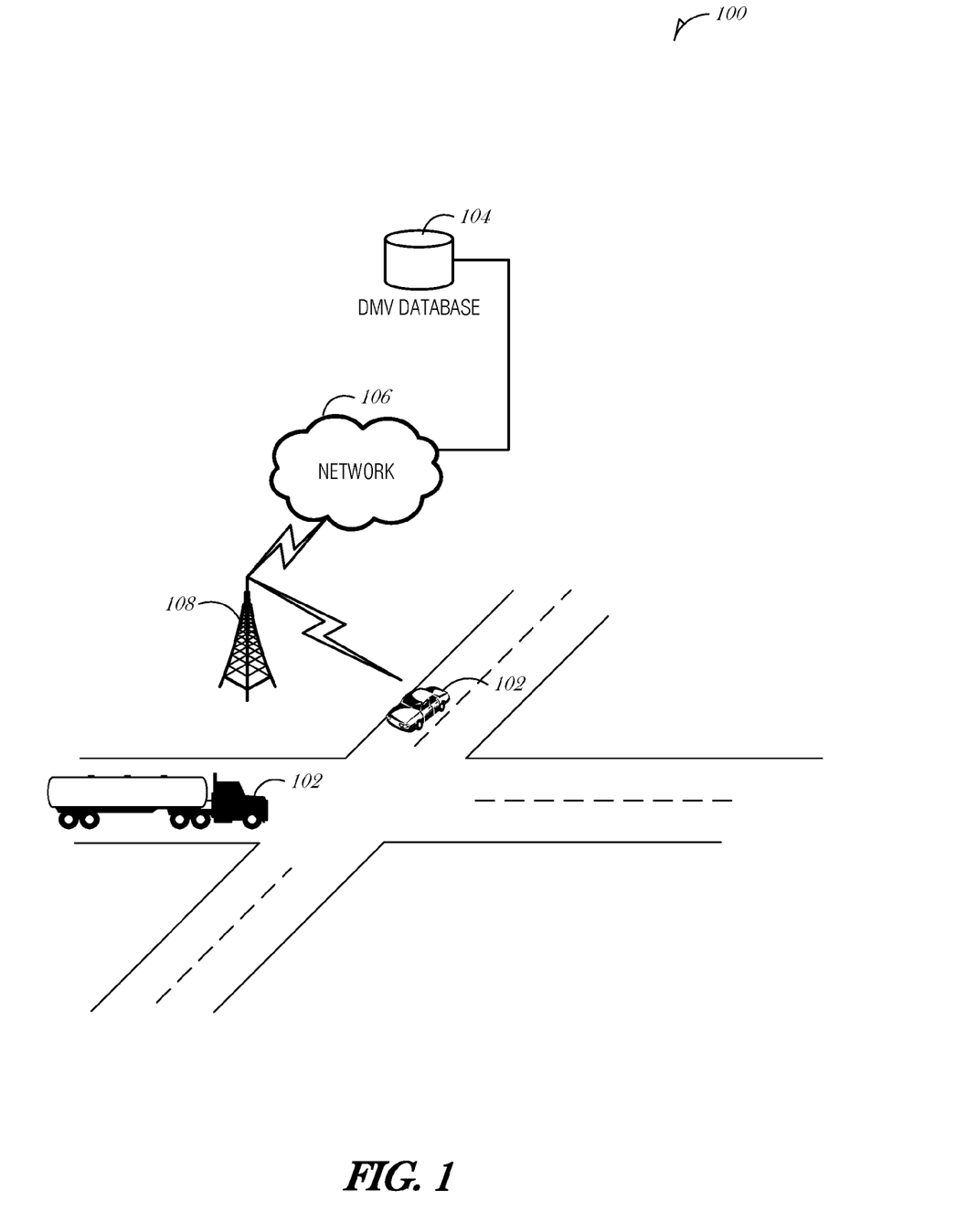
FIG. 1 is a schematic drawing illustrating an operating environment, according to an embodiment.

FIG. 1 is a schematic drawing illustrating an operating environment 100, according to an embodiment. The operating environment 100 includes vehicles 102 and a department of motor vehicles (DMV) database 104. The DMV database 104 includes registration information for the vehicles 102, such as the identity of the vehicle owner, residence, and other contact information, fees due, fees paid, area or region registered, registration validity information (e.g., length of registration or expiration of registration), make and model of the vehicle, year of production of the vehicle, color or other description of the vehicle, and the like. In some cases, the vehicle 102 may be communicatively coupled to the DMV database 104 via a network 106. The network 106 may include an access point 108, which may be a cellular radio tower, Wi-Fi access point, or the like. The network 106 may include local-area networks (LAN), wide-area networks (WAN), wireless networks (e.g., 802.11 or cellular network), the Public Switched Telephone Network (PSTN) network, ad hoc networks, personal area networks (e.g., Bluetooth) or other combinations or permutations of network protocols and network types. The network 108 may include a single local area network (LAN) or wide-area network (WAN), or combinations of LANs or WANs, such as the Internet. The various devices (e.g., access point 106 or vehicle 102) may be coupled to the network 106 via one or more wired or wireless connections.

Figure 2:
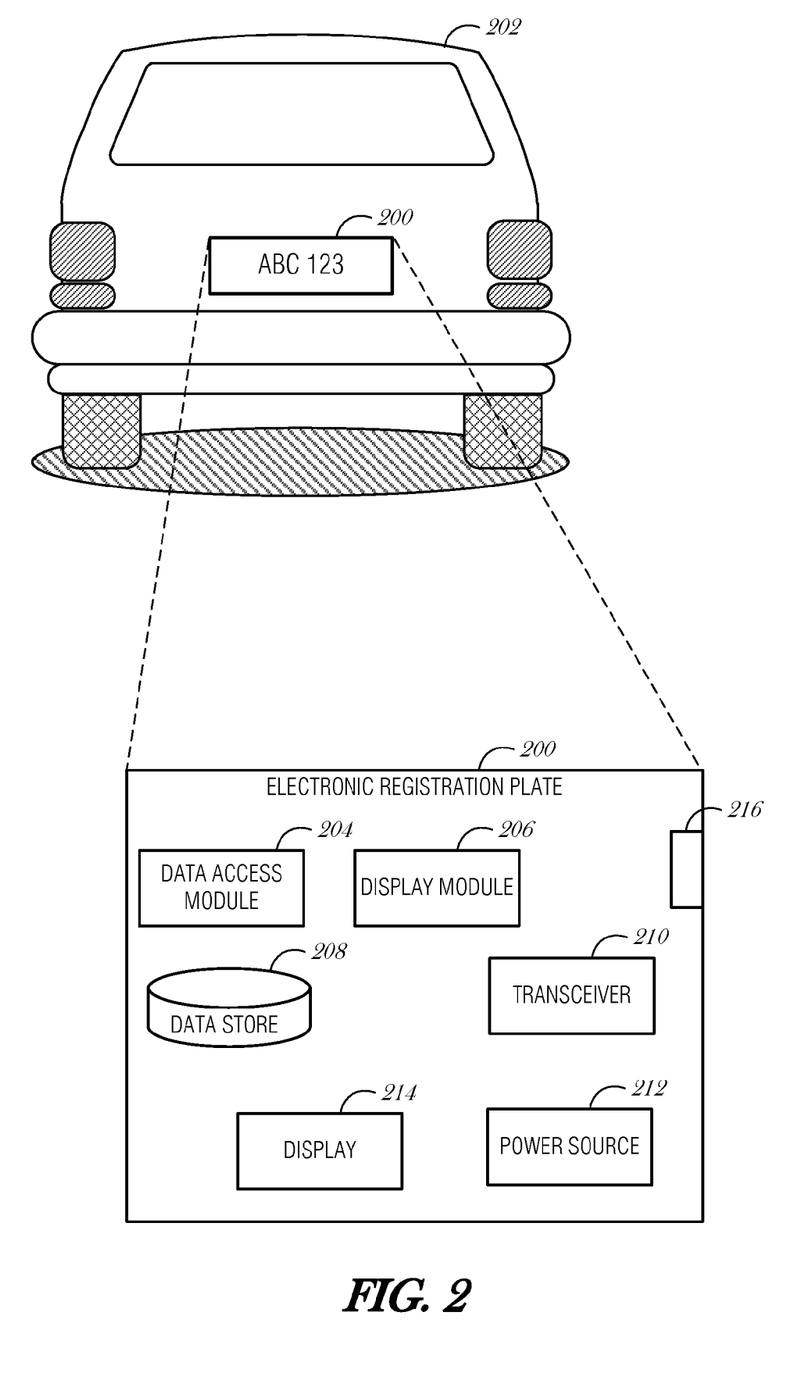
FIG. 2 is a schematic diagram illustrating an electronic registration plate, according to an embodiment.

The vehicle 102 may be equipped with an electronic registration plate (illustrated in FIG. 2). The electronic registration plate may interface with the vehicle 102, such as with a short range communication protocol (e.g., Bluetooth). In alternative examples though, the electronic registration plate may operate independent from the vehicle 102 and may not have any wireless communication mechanisms installed.

When a person registers a vehicle 102 with the department of motor vehicles (or an equivalent registration authority), the person is provided a set of registration numbers. The registration numbers may be provided in a secure manner, such as on a read only media or in an encrypted form. Before operating the vehicle 102, the person installs the registration numbers in the electronic registration plate. As the person operates the vehicle 102, the electronic registration plate periodically displays one of the registration numbers from the set of registration numbers. In an example, the electronic registration plate is configured so that it does not re-use any of the registration numbers. As such, the set of registration numbers may be rather large depending on the periodicity of the change. For example, given a change every five miles driven, a vehicle 102 with an expected lifetime of 200,000 miles should be equipped with 40,000 registration numbers.

In some cases where the electronic registration plate is equipped with a communications mechanism, the registration numbers may be loaded into the electronic registration plate remotely. The communication pathway may directly come from the DBV database 104 via the network 106 and access point 108, or may be by way of the vehicle 102 (e.g., via an onboard system installed in the vehicle 102).

FIG. 2 is a schematic diagram illustrating an electronic registration plate 200, according to an embodiment. The electronic registration plate 200 is shown as being affixed to the rear of a vehicle 202. A second electronic registration plate 200 may be affixed to the front of the vehicle 202, or in another position according to local regulations. The electronic registration plate 200 includes a data access module 204, a display module 206, and a data store 208. In addition, the electronic registration plate 200 may include a transceiver 210, which may be a wireless transceiver, a power source 212, a display 214, an expansion port 216, and other mechanical or electronic components (e.g., antennas, additional expansion ports, an electric plug for recharging, etc.). The transceiver 210 may be configured to communicate using at least one wireless communication standard such as 3GPP LTE, WiMAX, High Speed Packet Access (HSPA), Bluetooth, or Wi-Fi. The electronic registration plate 200 may communicate using separate antennas for each wireless communication standard or shared antennas for multiple wireless communication standards. The electronic registration plate 200 may communicate in a wireless local area network (WLAN), a wireless personal area network (WPAN), and/or a wireless wide area network (WWAN). The display 214 may be a liquid crystal display (LCD) screen or other type of display screen such as an organic light emitting diode (OLED) display, electronic paper, electroluminescent lamp display, or the like.

In some cases, where a front and rear license plate are required, the plates may be hard wired together or make use of a 1:1 wireless network using such protocols as Bluetooth or Wi-Fi.

In some examples, the electronic registration plate 200 receives power via the vehicle 202, such as being wired into the vehicle's 12v system. In other examples, the electronic registration plate 200 includes the power source 212 and operates independent from the vehicle 202. The power source 212 may be any type of battery power, including but not limited to various lithium-based batteries, nickel-cadmium batteries, zinc-carbon batteries, zinc-chloride batteries, or the like.

The expansion port 216 may be various types of ports such as a universal serial bus (USB) port or a serial port. The expansion port 216 may not exist on models of the electronic registration plate 200 that use a near-field or short-range wireless connection to load the electronic registration plate 200 with the registration numbers.

FIG. 2 illustrates an electronic registration plate 200 for protecting privacy with secure digital signage, the electronic registration plate 200 attached to a vehicle, the electronic registration plate 200 comprising a data access module 204 to access a data store 208 of registration numbers. The data store 208 is to store a plurality of unique registration plate numbers assigned to the vehicle. The data access module 204 is further to retrieve a registration plate number from the data store 208. In an embodiment, to retrieve the registration plate number from the data store 208, the data access module 204 is to retrieve the registration plate number in a non-sequential order. For example, the data access module 204 may retrieve registration plate numbers in a random order from the data store 208.

The display module 206 is then to present the registration plate number on the electronic registration plate 200.

In an embodiment, the data access module 204 is to maintain a record of which registration plate numbers of the plurality of unique registration plate numbers have been presented on the electronic registration plate and when retrieving the registration plate number from the data store, the data access module 204 is to retrieve an unused registration plate number from the data store. By avoiding reuse of registration numbers, the vehicle 202 is harder to trace.

In an embodiment, the display module 206 is to disable the presentation of the registration plate number on the electronic registration plate 200 while the vehicle is stationary. For example, when the vehicle 200 is parked, to enhance privacy, the electronic registration plate 200 may be disabled. While the electronic registration plate 200 is disabled, it may be powered off displayed a blank (e.g., black) screen. Alternatively, the electronic registration plate 200 may display another placeholder image other than a registration plate number (e.g., a logo, a sports team, a message, a color block, etc.). An authorized person, such as a parking patrol or police officer may selectively activate the electronic registration plate 200 temporarily to have the electronic registration plate 200 display the current registration number. After displaying the registration number for a time, such as a timeout period, the electronic registration plate 200 may return to a sleep or standby mode. The electronic registration plate 200 may be temporarily activated by a wireless signal or physical activation, such as by pressing a button on the electronic registration plate 200.

In an embodiment, the plurality of unique registration plate numbers are specific to a region corresponding to a registration region of the vehicle. For example, the registration plate numbers may be assigned from a certain region (e.g., the state of Minnesota or Linn County, Iowa). In an embodiment, the plurality of unique registration plate numbers are randomly generated. Using some non-sequential assignment technique, such as randomization will help maintain a level of security for the vehicle 202. In particular, anyone trying to track the vehicle 202 will be at a disadvantage having no clear way to associate registration plate numbers with the vehicle 202.

In some cases, the vehicle owner may want to have personalized plates (e.g., vanity plates). Thus, in an embodiment, the plurality of unique registration plate numbers are generated based on input provided by a person associated with the vehicle. The input may be a topic, a phrase, or some other seed value and the registration plate numbers may then be generated from that general seed value. For example, the person may provide the topic of "American football" and the various registration plates may include phrases such as "f00tBALL" or "k1ck3r".

In some cases, the data store 208 is located remote from the electronic registration plate 200. In such cases, the electronic registration plate 200 may communicate over a network to access and obtain a registration plate number for display. In an embodiment, the data store is located at a remote location from the electronic registration plate 200 and wherein to retrieve the registration plate number, the data access module 204 is to query the remote location for the registration plate number and receive the registration plate number from the remote location. The remote location may be in the vehicle 202 or remote from the vehicle (e.g., a cloud service). Thus, in an embodiment, the remote location comprises a cloud server. In another embodiment, to retrieve the registration plate number, the data access module 204 is to interface with an onboard system installed in the vehicle 202 and receive the registration plate number via the onboard system.

Periodically, the electronic registration plate 200 changes the registration plate number being displayed. In an embodiment, the data access module 204 is to determine that a new registration plate number is needed and retrieve the registration plate number when the new registration plate number is needed. The time to change the registration plate number may be user configurable, such as by the owner of the vehicle or an operator of the department of motor vehicles (or equivalent agency). In some cases, the period used to change the registration plate number is based on the number of miles (or kilometers) driven, not an absolute time period. Thus, in an embodiment, to determine that the new registration plate is needed, the data access module 204 is to monitor a distance traveled by the vehicle and determine that the new registration plate is needed after the vehicle has traveled a threshold distance. The threshold distance may be any distance. In an embodiment, the threshold distance is five miles. A five mile threshold distance is based on observations that an average commute between home and work is approximately 26 miles and an average trip length while running errands is approximately 10 miles. If looking for at least one registration plate change during a trip, then the threshold should not be larger than 10 miles and preferably less than half that distance to ensure that at least one registration plate change is effected during shorter trips.

Monitoring the distance traveled may be performed by the electronic registration plate 200, the vehicle 202, or some other system. In an embodiment, to monitor the distance traveled by the vehicle, the data access module 204 is to access a location tracking system installed on the electronic registration plate 200. The location tracking system may include a global positioning system (GPS) receiver. In another embodiment, to monitor the distance traveled by the vehicle, the data access module 204 is to interface with an onboard system, the onboard system including a location tracking system. In an embodiment, the location tracking system in the onboard system may include a GPS receiver.

Figure 3:
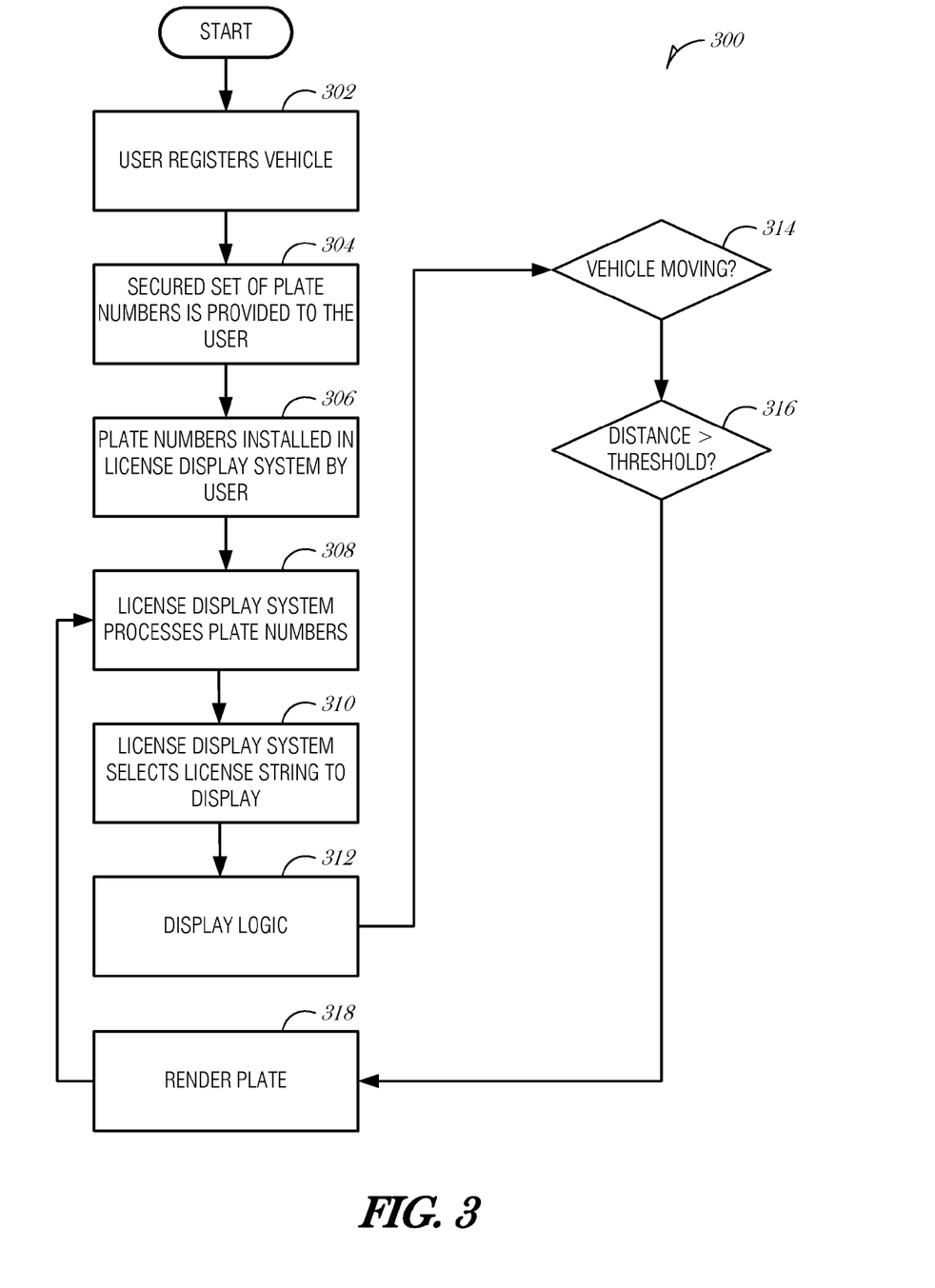
FIG. 3 is a diagram illustrating the control flow for protecting privacy with secure digital signage in a vehicle registration plate, according to an embodiment.

FIG. 3 is a diagram illustrating the control flow 300 for protecting privacy with secure digital signage in a vehicle registration plate, according to an embodiment. At block 302, a user registers a vehicle. This may be done when the ownership of the vehicle changes hands, such as when the user buys the vehicle from a dealership or from another private party. The registration may be substantially similar to the conventional registration process, where the user may submit forms to the registration authority, pay fees and taxes, and obtain license plates and tabs.

At block 304, a set of plate numbers is provided to the user. The set may be secured, such as by being encrypted or stored on a secured media (e.g., password locked, read-only, or limited by biometric access). In some cases, an additional level of security may be provided where the media, more specifically a storage device with compute capability, containing the unique plate numbers may only be read twice; once for the rear plate and once for the front plate.

At block 306, the plate numbers are installed in the license display system (e.g., electronic registration plate 200). The plate numbers may be transferred via short range telemetry (e.g., USB or NFC communication) or by a physical port access (e.g., USB or serial). If the plate numbers are transferred using a wireless or wired telemetry, the connection may be secured, such as with a public/private key system or the like.

At block 308, the license display system processes the plate numbers. This may include operations such as organizing the plate numbers in local storage to maintain which plate numbers are available for use or have been used. Additional operations such as verifying the authenticity of the plate numbers or encrypting the plate numbers may also be performed at block 308.

At block 310, the license display system selecting a license string to display. The license string is one of the plate numbers that were generated and provided to the user in the set of plate numbers. The license string may include numeric, alpha numeric, or symbols in the string. The number of characters or symbols used is a design decision and based on the number of distinct plate numbers needed for a particular jurisdiction or region.

At block 312, the display logic operates to determine when to display a new plate numbers. At decision block 314, it is determined whether the vehicle is moving. If so, then at decision block 316, it is determined whether the vehicle has moved an aggregate distance more than a threshold distance. For example, the threshold distance may be 5 miles. If the vehicle has traveled 2 hours in a previous trip and now has traveled an additional 3 miles in the current trip, the display logic 312 may determine to change the plate number.

At block 318, the plate is rendered. If the plate does not need to change based on the vehicle not having traveled more than the threshold distance, then the plate number is left alone. The operation flows back to 308 to continue to process plate numbers and make determinations based on vehicle movement and distance. There may be a brief timeout period (e.g., 30 seconds) between iterations.

Figure 4:
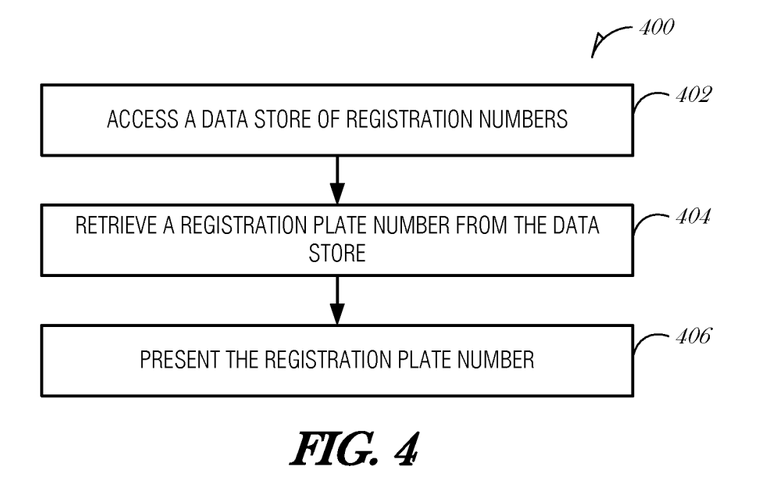
FIG. 4 is a flowchart illustrating a method of protecting privacy with secure digital signage, according to an embodiment.

FIG. 4 is a flowchart illustrating a method 400 of protecting privacy with secure digital signage, according to an embodiment. At block 402, an electronic registration plate attached to a vehicle, accesses a data store of registration numbers, the data store including a plurality of unique registration plate numbers and assigned to the vehicle.

At block 404, a registration plate number is retrieved from the data store. In an embodiment, retrieving the registration plate number comprises interfacing with an onboard system installed in the vehicle and receiving the registration plate number via the onboard system.

At block 406, the registration plate number is presented on the electronic registration plate.

In a further embodiment, the method 400 includes maintaining a record of which registration plate numbers of the plurality of unique registration plate numbers have been presented on the electronic registration plate. In such an embodiment, the retrieving the registration plate number from the data store comprises retrieving an unused registration plate number from the data store.

In a further embodiment, the method 400 includes disabling the presentation of the registration plate number on the electronic registration plate while the vehicle is stationary.

In an embodiment, the plurality of unique registration plate numbers are specific to a region corresponding to a registration region of the vehicle.

In an embodiment, retrieving the registration plate number from the data store comprises retrieving the registration plate number in a non-sequential order. In an embodiment, the plurality of unique registration plate numbers are randomly generated.

In an embodiment, the plurality of unique registration plate numbers are generated based on input provided by a person associated with the vehicle.

In an embodiment, the data store is located at a remote location from the electronic registration plate. In such an embodiment, retrieving the registration plate number comprises querying the remote location for the registration plate number and receiving the registration plate number from the remote location. In an embodiment, the remote location comprises a cloud server.

In a further embodiment, the method 400 includes determining that a new registration plate number is needed and retrieving the registration plate number when the new registration plate number is needed.

In an embodiment, determining that the new registration plate is needed comprises monitoring a distance traveled by the vehicle and determining that the new registration plate is needed after the vehicle has traveled a threshold distance. In an embodiment, the threshold distance is five miles. In an embodiment, monitoring the distance traveled by the vehicle comprises accessing a location tracking system installed on the electronic registration plate.

In an embodiment, monitoring the distance traveled by the vehicle comprises interfacing with an onboard system, the onboard system including a location tracking system. In a further embodiment, the location tracking system comprises a global positioning system.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 5:
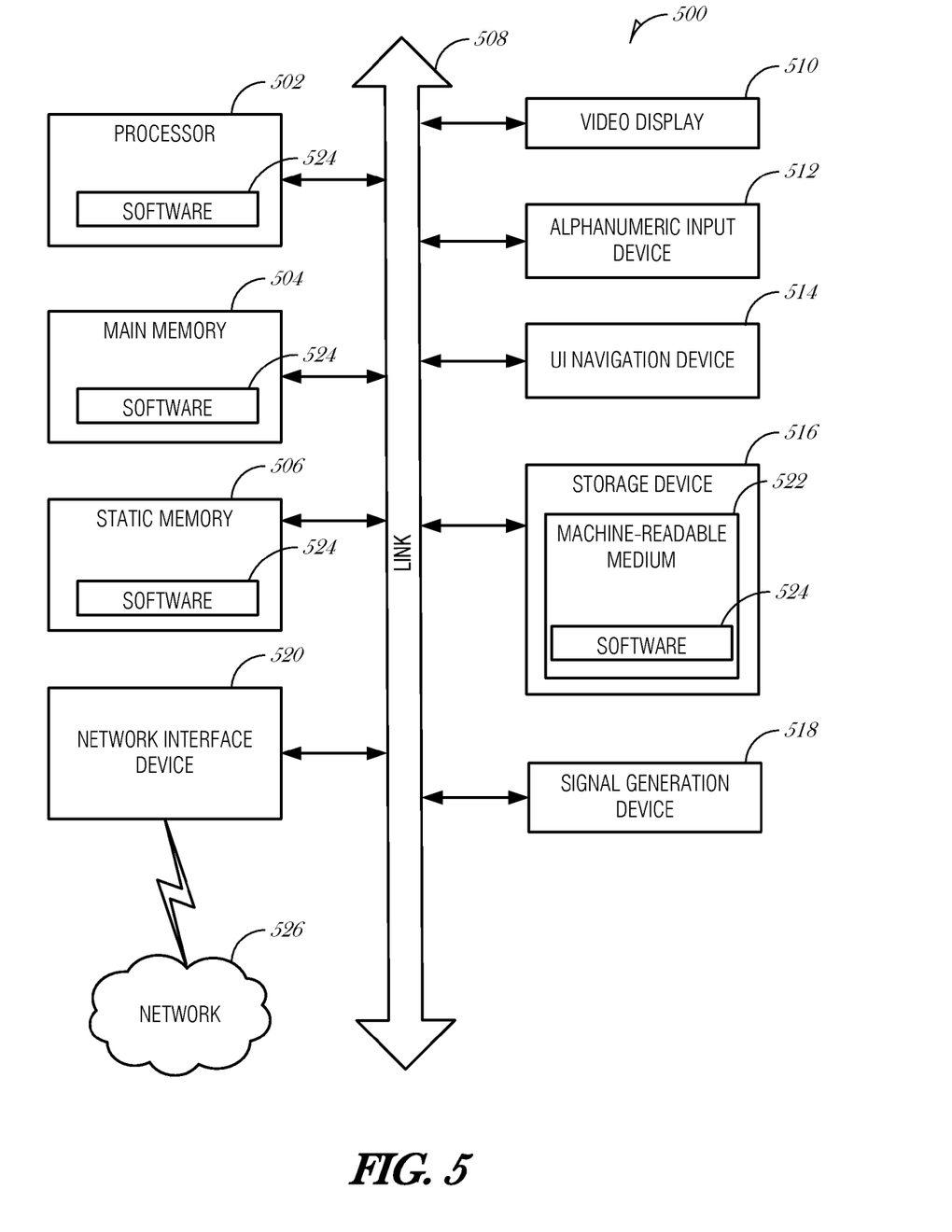
FIG. 5 is a block diagram illustrating an example machine upon which any one or more of the techniques (e.g., methodologies) discussed herein may perform, according to an example embodiment.

FIG. 5 is a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, set-top box, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 includes subject matter for a system with an electronic registration plate for protecting privacy with secure digital signage (such as a device, apparatus, or machine), the electronic registration plate attached to a vehicle, the system comprising: a data access module to: access, a data store of registration numbers, the data store including a plurality of unique registration plate numbers and assigned to the vehicle; and retrieve a registration plate number from the data store; and a display module to present the registration plate number on the electronic registration plate.

In Example 2, the subject matter of Example 1 may include, wherein the data access module is to: maintain a record of which registration plate numbers of the plurality of unique registration plate numbers have been presented on the electronic registration plate; and wherein to retrieve the registration plate number from the data store, the data access module is to retrieve an unused registration plate number from the data store.

In Example 3, the subject matter of any one of Examples 1 to 2 may include, wherein the display module is to disable the presentation of the registration plate number on the electronic registration plate while the vehicle is stationary.

In Example 4, the subject matter of any one of Examples 1 to 3 may include, wherein the plurality of unique registration plate numbers are specific to a region corresponding to a registration region of the vehicle.

In Example 5, the subject matter of any one of Examples 1 to 4 may include, wherein to retrieve the registration plate number from the data store, the data access module is to retrieve the registration plate number in a non-sequential order.

In Example 6, the subject matter of any one of Examples 1 to 5 may include, wherein the plurality of unique registration plate numbers are randomly generated.

In Example 7, the subject matter of any one of Examples 1 to 6 may include, wherein the plurality of unique registration plate numbers are generated based on input provided by a person associated with the vehicle.

In Example 8, the subject matter of any one of Examples 1 to 7 may include, wherein the data store is located at a remote location from the electronic registration plate and wherein to retrieve the registration plate number, the data access module is to: query the remote location for the registration plate number; and receive the registration plate number from the remote location.

In Example 9, the subject matter of any one of Examples 1 to 8 may include, wherein the remote location comprises a cloud server.

In Example 10, the subject matter of any one of Examples 1 to 9 may include, wherein to retrieve the registration plate number, the data access module is to: interface with an onboard system installed in the vehicle; and receive the registration plate number via the onboard system.

In Example 11, the subject matter of any one of Examples 1 to 10 may include, wherein the data access module is to: determine that a new registration plate number is needed; and retrieve the registration plate number when the new registration plate number is needed.

In Example 12, the subject matter of any one of Examples 1 to 11 may include, wherein to determine that the new registration plate is needed, the data access module is to: monitor a distance traveled by the vehicle; and determine that the new registration plate is needed after the vehicle has traveled a threshold distance.

In Example 13, the subject matter of any one of Examples 1 to 12 may include, wherein the threshold distance is five miles.

In Example 14, the subject matter of any one of Examples 1 to 13 may include, wherein to monitor the distance traveled by the vehicle, the data access module is to: access a location tracking system installed on the electronic registration plate.

In Example 15, the subject matter of any one of Examples 1 to 14 may include, wherein to monitor the distance traveled by the vehicle, the data access module is to: interface with an onboard system, the onboard system including a location tracking system.

In Example 16, the subject matter of any one of Examples 1 to 15 may include, wherein the location tracking system comprises a global positioning system.

Example 17 includes subject matter for protecting privacy with secure digital signage (such as a method, means for performing acts, machine readable medium including instructions that when performed by a machine cause the machine to performs acts, or an apparatus to perform) comprising: accessing by an electronic registration plate attached to a vehicle, a data store of registration numbers, the data store including a plurality of unique registration plate numbers and assigned to the vehicle; retrieving a registration plate number from the data store; and presenting the registration plate number on the electronic registration plate.

In Example 18, the subject matter of Example 17 may include, further comprising: maintaining a record of which registration plate numbers of the plurality of unique registration plate numbers have been presented on the electronic registration plate; and wherein retrieving the registration plate number from the data store comprises retrieving an unused registration plate number from the data store.

In Example 19, the subject matter of any one of Examples 17 to 18 may include, further comprising: disabling the presentation of the registration plate number on the electronic registration plate while the vehicle is stationary.

In Example 20, the subject matter of any one of Examples 17 to 19 may include, wherein the plurality of unique registration plate numbers are specific to a region corresponding to a registration region of the vehicle.

In Example 21, the subject matter of any one of Examples 17 to 20 may include, wherein retrieving the registration plate number from the data store comprises: retrieving the registration plate number in a non-sequential order.

In Example 22, the subject matter of any one of Examples 17 to 21 may include, wherein the plurality of unique registration plate numbers are randomly generated.

In Example 23, the subject matter of any one of Examples 17 to 22 may include, wherein the plurality of unique registration plate numbers are generated based on input provided by a person associated with the vehicle.

In Example 24, the subject matter of any one of Examples 17 to 23 may include, wherein the data store is located at a remote location from the electronic registration plate and wherein retrieving the registration plate number comprises: querying the remote location for the registration plate number; and receiving the registration plate number from the remote location.

In Example 25, the subject matter of any one of Examples 17 to 24 may include, wherein the remote location comprises a cloud server.

In Example 26, the subject matter of any one of Examples 17 to 25 may include, wherein retrieving the registration plate number comprises: interfacing with an onboard system installed in the vehicle; and receiving the registration plate number via the onboard system.

In Example 27, the subject matter of any one of Examples 17 to 26 may include, further comprising: determining that a new registration plate number is needed; and retrieving the registration plate number when the new registration plate number is needed.

In Example 28, the subject matter of any one of Examples 17 to 27 may include, wherein determining that the new registration plate is needed comprises: monitoring a distance traveled by the vehicle; and determining that the new registration plate is needed after the vehicle has traveled a threshold distance.

In Example 29, the subject matter of any one of Examples 17 to 28 may include, wherein the threshold distance is five miles.

In Example 30, the subject matter of any one of Examples 17 to 29 may include, wherein monitoring the distance traveled by the vehicle comprises: accessing a location tracking system installed on the electronic registration plate.

In Example 31, the subject matter of any one of Examples 17 to 30 may include, wherein monitoring the distance traveled by the vehicle comprises: interfacing with an onboard system, the onboard system including a location tracking system.

In Example 32, the subject matter of any one of Examples 17 to 31 may include, wherein the location tracking system comprises a global positioning system.

Example 33 includes at least one machine-readable medium including instructions, which when executed by a machine, cause the machine to perform operations of any of the Examples 17-32.

Example 34 includes an apparatus comprising means for performing any of the Examples 17-32.

Example 35 includes subject matter for protecting privacy with secure digital signage (such as a device, apparatus, or machine) comprising: means for accessing by an electronic registration plate attached to a vehicle, a data store of registration numbers, the data store including a plurality of unique registration plate numbers and assigned to the vehicle; means for retrieving a registration plate number from the data store; and means for presenting the registration plate number on the electronic registration plate.

In Example 36, the subject matter of Example 35 may include, further comprising: means for maintaining a record of which registration plate numbers of the plurality of unique registration plate numbers have been presented on the electronic registration plate; and wherein the means for retrieving the registration plate number from the data store comprises means for retrieving an unused registration plate number from the data store.

In Example 37, the subject matter of any one of Examples 35 to 36 may include, further comprising: means for disabling the presentation of the registration plate number on the electronic registration plate while the vehicle is stationary.

In Example 38, the subject matter of any one of Examples 35 to 37 may include, wherein the plurality of unique registration plate numbers are specific to a region corresponding to a registration region of the vehicle.

In Example 39, the subject matter of any one of Examples 35 to 38 may include, wherein the means for retrieving the registration plate number from the data store comprises: means for retrieving the registration plate number in a non-sequential order.

In Example 40, the subject matter of any one of Examples 35 to 39 may include, wherein the plurality of unique registration plate numbers are randomly generated.

In Example 41, the subject matter of any one of Examples 35 to 40 may include, wherein the plurality of unique registration plate numbers are generated based on input provided by a person associated with the vehicle.

In Example 42, the subject matter of any one of Examples 35 to 41 may include, wherein the data store is located at a remote location from the electronic registration plate and wherein the means for retrieving the registration plate number comprises: means for querying the remote location for the registration plate number; and means for receiving the registration plate number from the remote location.

In Example 43, the subject matter of any one of Examples 35 to 42 may include, wherein the remote location comprises a cloud server.

In Example 44, the subject matter of any one of Examples 35 to 43 may include, wherein the means for retrieving the registration plate number comprises: means for interfacing with an onboard system installed in the vehicle; and means for receiving the registration plate number via the onboard system.

In Example 45, the subject matter of any one of Examples 35 to 44 may include, further comprising: means for determining that a new registration plate number is needed; and means for retrieving the registration plate number when the new registration plate number is needed.

In Example 46, the subject matter of any one of Examples 35 to 45 may include, wherein the means for determining that the new registration plate is needed comprises: means for monitoring a distance traveled by the vehicle; and means for determining that the new registration plate is needed after the vehicle has traveled a threshold distance.

In Example 47, the subject matter of any one of Examples 35 to 46 may include, wherein the threshold distance is five miles.

In Example 48, the subject matter of any one of Examples 35 to 47 may include, wherein the means for monitoring the distance traveled by the vehicle comprises: means for accessing a location tracking system installed on the electronic registration plate.

In Example 49, the subject matter of any one of Examples 35 to 48 may include, wherein the means for monitoring the distance traveled by the vehicle comprises: means for interfacing with an onboard system, the onboard system including a location tracking system.

In Example 50, the subject matter of any one of Examples 35 to 49 may include, wherein the location tracking system comprises a global positioning system.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system with an electronic vehicle registration plate for protecting privacy with secure digital signage, the electronic vehicle registration plate configured to attach to a vehicle, the system comprising:
   a data store configured to store simultaneously thereon a plurality of unused registration plate numbers that are predetermined and assigned to the vehicle for one specific owner when the vehicle is registered;
   a data access module that provides privacy protection by repeatedly changing an active registration plate number, wherein the data access module is configured to access the data store and retrieve a new unused registration plate number from the plurality of unused registration plate numbers from the data store; and
   a display module configured to present the new unused registration plate number on the electronic vehicle registration plate as the active registration plate number.

2. The system of claim 1, wherein the data access module is further configured to:
   maintain a record of which registration plate numbers have been presented on the display module.

3. The system of claim 1, wherein the display module is further configured to:
   disable presentation of the active registration plate number on the electronic vehicle registration plate while the vehicle is stationary.

4. The system of claim 1, wherein the plurality of unused registration plate numbers are specific to a region corresponding to a registration region of the vehicle.

5. The system of claim 1, wherein the data access module retrieves the new unused registration plate number in a non-sequential order from the plurality of unused registration plate numbers on the data store.

6. The system of claim 1, wherein the data access module retrieves each new unused registration plate number from the plurality of unused registration plate numbers one at a time in random order.

7. The system of claim 1, wherein the plurality of unused registration plate numbers are generated based on input provided by a person associated with the vehicle.

8. The system of claim 1, wherein the data store is located at a remote location from the electronic vehicle registration plate, and wherein to retrieve the new unused registration plate number, the data access module is further configured to:
   query the remote location for the new unused registration plate number; and
   receive the new unused registration plate number from the remote location.

9. The system of claim 8, wherein the remote location comprises a cloud server.

10. The system of claim 1, wherein the data store, the data access module, and the display module are all located at the electronic vehicle registration plate.

11. The system of claim 1, wherein the data access module is further configured to:
    determine that a new registration plate number is needed; and
    retrieve the new unused registration plate number when the new registration plate number is needed.

12. The system of claim 11, wherein to determine that the new registration plate number is needed, the data access module is further configured to:
    monitor a distance traveled by the vehicle; and
    determine that the new registration plate number is needed after the vehicle has traveled a threshold distance.

13. The system of claim 12, wherein the threshold distance is five miles.

14. The system of claim 12, wherein to monitor the distance traveled by the vehicle, the data access module is further configured to:
    access a location tracking system installed on the electronic vehicle registration plate.

15. The system of claim 12, wherein to monitor the distance traveled by the vehicle, the data access module is further configured to:
    interface with an onboard system, the onboard system including a location tracking system.

16. The system of claim 15, wherein the location tracking system comprises a global positioning system.

17. A method of protecting privacy with secure digital signage, the method comprising:
storing, in a data store, simultaneously a plurality of unused registration plate numbers that are predetermined and assigned to a vehicle for one specific owner when the vehicle is registered;
accessing the data store by an electronic vehicle registration plate attached to the vehicle;
retrieving a new unused registration plate number from the plurality of unused registration plate numbers from the data store;
presenting the new unused registration plate number on the electronic vehicle registration plate as an active registration plate number; and
repeating the accessing, retrieving, and presenting steps multiple times to provide privacy protection by repeatedly changing the registration plate number shown by the electronic registration plate.

18. The method of claim 17, further comprising:
maintaining a record of which registration plate numbers have been presented on the electronic vehicle registration plate.

19. The method of claim 17, further comprising:
disabling presentation of the active registration plate number on the electronic vehicle registration plate while the vehicle is stationary.

20. The method of claim 17, wherein the plurality of unused registration plate numbers are specific to a region corresponding to a registration region of the vehicle.

21. At least one non-transitory machine-readable medium including instructions for protecting privacy with secure digital signage, which when executed by a machine, cause the machine to:
store, in a data store, simultaneously a plurality of unused registration plate numbers that are predetermined and assigned to a vehicle for one specific owner when the vehicle is registered;
access the data store by an electronic vehicle registration plate attached to the vehicle;
retrieve a new unused registration plate number from the plurality of unused registration plate numbers from the data store;
present the new unused registration plate number on the electronic vehicle registration plate as an active registration plate number; and
repeating the accessing, retrieving, and presenting steps multiple times to provide privacy protection by repeatedly changing the registration plate number shown by the electronic registration plate.

22. The non-transitory machine-readable medium of claim 21, further comprising instructions which cause the machine to:
Maintain a record of which registration plate numbers have been presented on the electronic vehicle registration plate.

23. The non-transitory machine-readable medium of claim 21, further comprising instructions which cause the machine to:
determine that a new registration plate number is needed; and
retrieve the registration plate number when the new registration plate number is needed.

24. The non-transitory machine-readable medium of claim 23, wherein the instructions to determine that the new registration plate number is needed comprise instructions which cause the machine to:
monitor a distance traveled by the vehicle; and
determine that the new registration plate number is needed after the vehicle has traveled a threshold distance.

25. The non-transitory machine-readable medium of claim 24, wherein the instructions to monitor the distance traveled by the vehicle comprise instructions which cause the machine to:
access a location tracking system installed on the electronic vehicle registration plate.

* * * * *

UNITED STATES PATENT AND TRADEMARK OFFICE
CERTIFICATE OF CORRECTION

PATENT NO. : 9,684,797 B2
APPLICATION NO. : 14/566947
DATED : June 20, 2017
INVENTOR(S) : Robert Lawson Vaughn It is certified that error appears in the above-identified patent and that said Letters Patent is hereby corrected as shown below:

In the Claims

In Column 16, Line 16, in Claim 22, delete "Maintain" and insert --maintain-- therefor Signed and Sealed this
Tenth Day of April, 2018

Andrei Iancu
*Director of the United States Patent and Trademark Office*